US012416281B2

(12) United States Patent
Kusuhara

(10) Patent No.: US 12,416,281 B2
(45) Date of Patent: Sep. 16, 2025

(54) IGNITION DEVICE

(71) Applicant: DIAMOND & ZEBRA ELECTRIC MFG.CO., LTD., Osaka (JP)

(72) Inventor: Tsutomu Kusuhara, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 0 days.

(21) Appl. No.: 18/907,974

(22) Filed: Oct. 7, 2024

(65) Prior Publication Data

US 2025/0179983 A1 Jun. 5, 2025

(51) Int. Cl.
*F02P 3/04* (2006.01)
*F02P 9/00* (2006.01)

(52) U.S. Cl.
CPC ............ *F02P 3/0407* (2013.01); *F02P 9/002* (2013.01)

(58) Field of Classification Search
CPC .. F02P 9/002; F02P 17/12; F02P 5/145; F02P 9/00; F02P 3/0453; F02P 3/051; H01T 15/00; H01T 13/44; H02M 1/0003
USPC .......................................................... 123/650
See application file for complete search history.

(56) References Cited

U.S. PATENT DOCUMENTS

| | | | | |
|---|---|---|---|---|
| 11,898,528 | B2 * | 2/2024 | Kusuhara | F02P 3/051 |
| 2013/0208394 | A1 * | 8/2013 | Tanaya | F02P 3/0807 361/254 |
| 2021/0222665 | A1 * | 7/2021 | Nakamura | F02P 3/09 |

FOREIGN PATENT DOCUMENTS

JP 6517088 B2 5/2019

* cited by examiner

*Primary Examiner* — Logan M Kraft
*Assistant Examiner* — James J Kim
(74) *Attorney, Agent, or Firm* — Rimon P.C.

(57) ABSTRACT

For this ignition device, a fuel including hydrogen is used. The ignition device includes an ignition coil, a spark plug, a power supply device, a switching element, a first limiting diode, and a first resistor. Two first connecting wires are laid in parallel between the one end of the secondary coil and the spark plug. The first limiting diode is interposed in one first connecting wire and is forward-biased when oriented in a direction from one end to the other end of the secondary coil. The first limiting diode has a breakdown voltage that is equal to or higher than a maximum value of an ON-state voltage, and is lower than a discharge maintaining voltage of the spark plug. The first resistor is interposed in the other first connecting wire and has a resistance value of 10 MΩ or higher and of 50 MΩ or lower.

8 Claims, 8 Drawing Sheets

IGNITION DEVICE

RELATED APPLICATIONS

This application claims the benefit of Japanese Application No. 2023-205385, filed on Dec. 5, 2023, the disclosure of which is incorporated by reference herein.

BACKGROUND OF THE INVENTION

Field of the Invention

The present invention relates to an ignition device for use in an internal combustion engine.

Description of the Background Art

Conventionally, an ignition device is installed in an internal combustion engine including a spark-ignition (SI) reciprocating engine used in an automobile or the like. Under control of an engine control unit (ECU), an ignition coil of the ignition device steps up a low direct-current voltage supplied from a battery to several thousands of volts to several tens of thousands of volts, and provides the stepped-up voltage to a spark plug, to generate electric spark and ignite a fuel. An example of such a conventional ignition device is described in Japanese Patent No. 6517088, for example.

Japanese Patent No. 6517088 discloses an ignition device (1) for use in an internal combustion engine having the following configuration. First, a primary coil (21) of an ignition coil (2) is connected to a direct-current power supply (VB+) such as an on-vehicle battery. Then, by ON/OFF control of a main switching element (4), switching between passage and interruption of a primary current (I1) flowing through the primary coil (21) is performed (paragraph [0015] and FIG. 1). Further, one end of a secondary coil (22) that is magnetically coupled to the primary coil (21) via an iron core is connected to a spark plug (3). The other end of the secondary coil (22) is connected to a direct-current power supply line via an ON-voltage preventing diode (23). As a result, when the primary current (I1) is interrupted in the ignition coil (2), a high voltage is generated on a secondary side, and electrical breakdown is caused at a discharge gap in the spark plug (3). Further, when the primary current (I1) is interrupted in the ignition coil (2), a secondary current (I2) flows in a forward direction of the ON-voltage preventing diode (23) (paragraphs [0016] and [0029]). Meanwhile, when the primary coil (21) starts to be energized, an ON voltage of opposite polarity generated in the secondary coil (22) is suppressed by the ON-voltage preventing diode (23) (paragraph [0017]).

In recent years, a fuel including hydrogen is used in a spark-ignition (SI) reciprocating engine in many cases. It is considered that use of a fuel including hydrogen contributes to realization of a so-called low carbon society. On the other hand, however, hydrogen has properties of high combustibility at relatively low temperatures and of a high combustion rate. For this reason, for example, when a slight degree of discharge occurs in a spark plug at an unexpected timing, a fuel can possibly be ignited to burn. In this case, there is a fear of causing backfire in which flames move backward toward an intake device from a combustion chamber of an engine, after-fire in which a fuel remaining in an exhaust gas of an engine burns in an exhaust stream path or the like, or abnormal combustion such as pre-ignition in which an ignition timing is out of control.

Meanwhile, in a case in which there is residual energy near a spark plug or the like at the end of discharge of the spark plug in one cycle performed in a single-cylinder or multi-cylinder combustion chamber included in an internal combustion engine, a possibility that the fuel may be ignited to burn at an unexpected timing in a next cycle is increased. More specifically, in an intake process in a next cycle, a pressure in the cylinder is reduced. Then, when a new fuel-gas mixture flows in, discharge occurs due to residual energy, which further increases a possibility that the fuel may be ignited to burn. In a case in which the number of revolutions in each cylinder is large, in particular, a next cycle is started immediately. Hence, it is necessary to cause the residual energy to converge toward zero earlier.

SUMMARY OF THE INVENTION

It is an object of the present invention to provide a technology that can suppress occurrence of discharge at an unexpected timing (abnormal timing) in a spark plug. Specifically, it is an object of the present invention to provide a technology that can cause residual energy remaining near the spark plug or the like in the spark plug at the end of discharge, to converge toward zero earlier.

To solve the above-described problem, the first invention of the present application is directed to an ignition device for use in an internal combustion engine that uses a fuel including at least hydrogen, and includes an ignition coil, a power supply device, a switching element, a spark plug, a first limiting diode, and a first resistor. The ignition coil is formed by electromagnetic coupling of a primary coil and a secondary coil. The power supply device applies a direct-current voltage to one end of the primary coil via a power supply line. The switching element is interposed between the other end of the primary coil and a ground point, and is capable of performing switching between passage and interruption of a primary current flowing through the primary coil from the power supply device. The spark plug ignites the fuel by occurrence of discharge at a gap, in accordance with a high voltage induced at one end of the secondary coil. The first limiting diode comprises a Zener diode or an avalanche diode that is interposed in one of two first connecting wires laid in parallel between the one end of the secondary coil and the spark plug, and is forward-biased when the diode is oriented in a direction from the one end to the other end of the secondary coil. The first resistor is interposed in the other of the two first connecting wires. The first limiting diode has a breakdown voltage that is equal to or higher than a value calculated by multiplication of a voltage value of the direct-current voltage applied to the one end of the primary coil by the power supply device by a ratio of the number of turns of the secondary coil to the number of turns of the primary coil, and is lower than a discharge maintaining voltage at the gap in the spark plug. The first resistor has a resistance value that is equal to or higher than 10 MΩ and is equal to or lower than 50 MΩ.

The second invention of the present application is directed to the ignition device of the first invention, wherein the breakdown voltage is equal to or higher than 1 kV.

The third invention of the present application is directed to the ignition device of the first invention or the second invention, wherein the breakdown voltage is equal to or lower than 2 kV.

The fourth invention of the present application is directed to an ignition device for use in an internal combustion engine that uses a fuel including at least hydrogen, and includes an ignition coil, a power supply device, a switching element, a spark plug, a second limiting diode, and a second resistor. The ignition coil is formed by electromagnetic coupling of a primary coil and a secondary coil. The power supply device applies a direct-current voltage to one end of the primary coil via a power supply line. The switching element is interposed between the other end of the primary coil and a ground point, and is capable of performing switching between passage and interruption of a primary current flowing through the primary coil from the power supply device. The spark plug ignites the fuel by occurrence of discharge at a gap, in accordance with a high voltage induced at one end of the secondary coil. The second limiting diode comprises a Zener diode or an avalanche diode that is interposed in one of two second connecting wires laid in parallel between the other end of the secondary coil and the power supply device or the ground point, and is forward-biased when the diode is oriented in a direction from the one end to the other end of the secondary coil. The second resistor is interposed in the other of the two second connecting wires. The second limiting diode has a breakdown voltage that is equal to or higher than a value calculated by multiplication of a voltage value of the direct-current voltage applied to the one end of the primary coil by the power supply device by a ratio of the number of turns of the secondary coil to the number of turns of the primary coil, and is lower than a discharge maintaining voltage at the gap in the spark plug. The second resistor has a resistance value that is equal to or higher than 10 MΩ and is equal to or lower than 50 MΩ.

The fifth invention of the present application is directed to the ignition device of the fourth invention, wherein the breakdown voltage is equal to or higher than 1 kV.

The sixth invention of the present application is directed to the ignition device of the fourth invention or the fifth invention, wherein the breakdown voltage is equal to or lower than 2 kV.

The seventh invention of the present application is directed to the ignition device of any of the first to sixth inventions, which further includes a control unit configured to control the switching of the switching element. The control unit performs charge control in which the switching element is placed in a closed state, so that a primary current flows through the primary coil, to charge the primary coil, and performs discharge control in which, after the charge control, a state of the switching element is changed to an open state and a high voltage is induced at the one end of the secondary coil, so that discharge occurs at the gap in the spark plug. An absolute value of the voltage induced at the one end of the secondary coil at an ending point of the discharge control is higher than an absolute value of the voltage induced at the one end of the secondary coil at a starting point of the discharge control.

The eighth invention of the present application is directed to the ignition device of any of the first to seventh inventions, which further includes a floating capacitor formed between the one end of the secondary coil and the spark plug.

According to the first to eighth inventions of the present application, when a primary coil flows through the primary coil (in an ON state), a current flowing through the secondary coil can be suppressed by the limiting diode and the resistor connected in parallel with each other. This can suppress occurrence of discharge in the spark plug in an ON state. Further, after the discharge ends, an absolute value of a voltage value caused by residual energy remaining near the one end of the secondary coil, the spark plug, or the like can be significantly reduced to the breakdown voltage of the limiting diode at once, first. Moreover, after that, a current flows via the resistor, so that the absolute value of the voltage can be reduced toward zero earlier. This can further suppress occurrence of discharge in the spark plug at an abnormal timing afterward.

DESCRIPTION OF THE PREFERRED EMBODIMENTS

Figure 1:
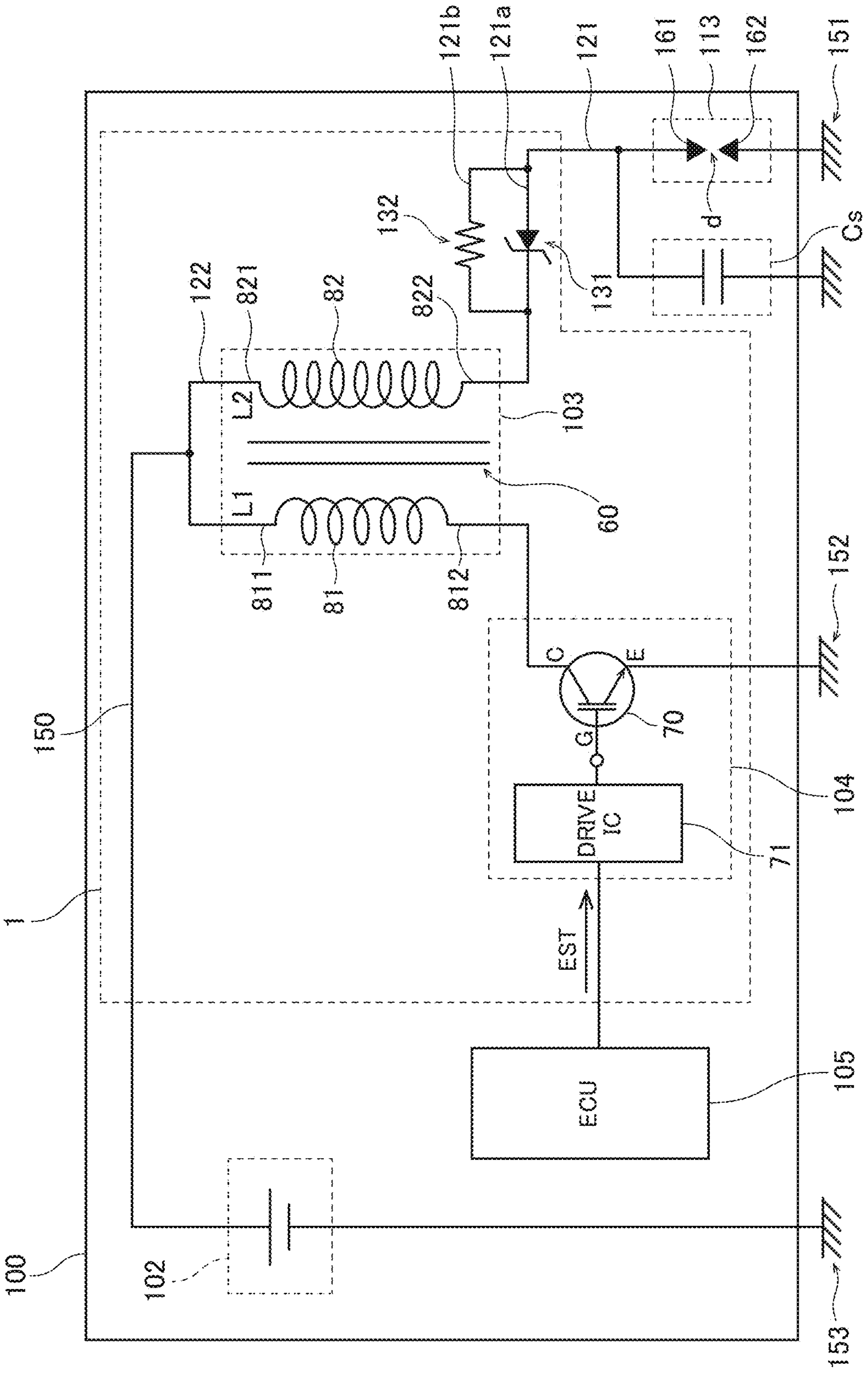
FIG. 1 is a block diagram schematically showing an operating environment of an ignition device for use in an internal combustion engine according to a first preferred embodiment.

Below, illustrative preferred embodiments of the present invention will be described with reference to the drawings. Note that components described in these embodiments are merely examples and are not intended to limit the scope of the present invention to those only. Further, in the drawings, for the purpose of easier understanding, the dimensions or the number of respective components are overstated or understated in some portions of illustration, as necessary.

1. First Preferred Embodiment

1-1. Configuration of Ignition Device

First, a configuration of an ignition device 1 for use in an internal combustion engine corresponding to a first preferred embodiment of the present invention will be described with reference to the drawings. FIG. 1 is a block diagram schematically showing an operating environment of the ignition device 1 according to the first preferred embodiment. Note that a primary coil L1 and a secondary coil L2 of an ignition coil 103 included in the ignition device 1 are arranged so as to be stacked on each other as described later. However, in FIG. 1, the primary coil L1 and the secondary coil L2 are shown as being arranged adjacent to each other, for the purpose of easy understanding.

The ignition device 1 according to the present embodiment is, for example, a device that is installed in an internal combustion engine such as a spark-ignition (SI) reciprocating engine used in a vehicle body 100 of an automobile or the like and applies a high voltage for causing spark discharge to occur in a spark plug 113. The ignition device 1 is provided in a cylinder or each of a plurality of cylinders included in the internal combustion engine.

Further, as shown in FIG. 1, the vehicle body 100 is equipped with the spark plug 113, a power supply device 102 (battery), and an engine control unit (ECU) 105, in addition to the ignition device 1. Note that, in a broad sense, the spark plug 113, the power supply device 102, and the ECU 105 can be regarded as being included in the ignition device 1.

The spark plug 113 is a device for performing an ignition operation in a combustion chamber of the internal combustion engine. The spark plug 113 is electrically connected to one end 822 of the secondary coil L2 of the ignition coil 103 described later via a conductor. Hereinafter, this conductor will be referred to as a "first connecting wire 121". The spark plug 113 is interposed between the one end 822 of the secondary coil L2 and a ground point (ground) 151. A high voltage is induced in the secondary coil L2 of the ignition coil 103. Then, when the high voltage exceeds an electrical breakdown voltage at a gap d (refer to FIG. 1) between a center electrode 161 and a ground electrode 162 of the spark plug 113, discharge occurs at the gap d, so that spark is generated. As a result, a fuel supplied to the internal combustion engine is ignited. In other words, the spark plug 113 ignites a fuel by occurrence of discharge at the gap d, in accordance with a high voltage induced at the one end 822 of the secondary coil L2.

In the present embodiment, hydrogen or a mixture of hydrogen and other materials is used as a fuel. That is, a fuel including at least hydrogen is used in the ignition device 1 for use in an internal combustion engine.

Further, in the first connecting wire 121 and the spark plug 113, an electrostatic capacitance component of approximately 15 to 20 pF is present. In other words, an electrostatic capacitance component is formed between the one end 822 of the secondary coil L2 and the spark plug 113. Hereinafter, the electrostatic capacitance component will be referred to as a "floating capacitor Cs" that is virtually defined. As shown in FIG. 1, the floating capacitor Cs can be schematically expressed in parallel with the spark plug 113 in the block diagram.

The power supply device 102 is a direct-current power chargeable/dischargeable device (storage battery). In the present embodiment, the power supply device 102 is electrically connected to the primary coil L1 of the ignition coil 103 described later via a conductor. Hereinafter, this conductor will be referred to as a "power supply line 150". The power supply device 102 applies a direct-current voltage to one end 811 of the primary coil L1 of the ignition coil 103 via the power supply line 150.

The ECU 105 is an existing computer that comprehensively controls operations and the like of a transmission and an air bag in the vehicle body 100.

The ignition device 1 includes the ignition coil 103, an igniter 104, a first limiting diode 131, and a first resistor 132.

Figure 2:
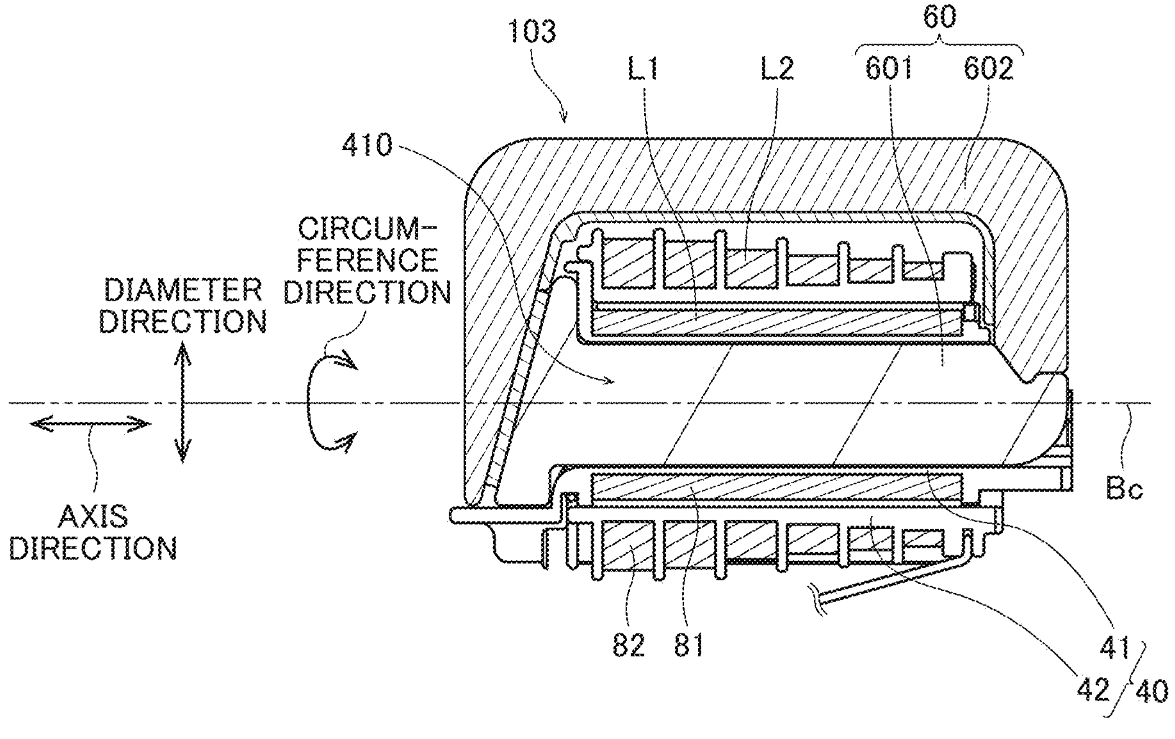
FIG. 2 is a longitudinal sectional view of an ignition coil according to the first preferred embodiment.

FIG. 2 is a longitudinal sectional view of the ignition coil 103. As shown in FIG. 2, the ignition coil 103 includes a bobbin 40, the primary coil L1, the secondary coil L2, and an iron core 60. Note that parts of the primary coil L1 and the secondary coil L2 are shown in a simplified manner in FIG. 2. Meanwhile, in the following description about the ignition coil 103, a direction parallel with a center axis Bc of the bobbin 40 will be referred to as an "axis direction". A direction perpendicular to the center axis Bc of the bobbin 40 will be referred to as a "diameter direction". A direction along an arc having its center on the center axis Bc of the bobbin 40 will be referred to as a "circumference direction". Further, the "direction parallel with something" includes a direction substantially parallel with something, and the "direction perpendicular to something" includes a direction substantially perpendicular to something.

The bobbin 40 includes a primary bobbin 41 and a secondary bobbin 42 that can be coupled to each other. Each of the primary bobbin 41 and the secondary bobbin 42 extends in a tubular shape along the center axis Bc. Further, the secondary bobbin 42 is placed on the diameter-direction outer side of the primary bobbin 41. For a material of the primary bobbin 41 and the secondary bobbin 42, resin is used, for example.

The primary coil L1 is formed by winding of a conductor around an outer surface of the primary bobbin 41 in the circumference direction having its center on the center axis Bc. Hereinafter, this conductor will be referred to as a "primary conductor 81". After the primary coil L1 is formed, the secondary bobbin 42 is placed so as to cover the outer surface of the primary coil L1, and is coupled to the primary bobbin 41. Then, a conductor different from the primary conductor 81 is wound around the outer surface of the secondary bobbin 42 in the circumference direction having its center on the center axis Bc, to thereby form the secondary coil L2. Hereinafter, this different conductor will be referred to as a "secondary conductor 82". By arranging the primary coil L1 and the secondary coil L2 such that the coils are stacked on each other in the above-described manner, it is possible to miniaturize the entire ignition coil 103 including those coils. However, arrangement of the primary coil L1 and the secondary coil L2 is not limited to the above-described case in which the coils are stacked on each other with the conductors being wound therearound. Alternatively, the primary coil L1 and the secondary coil L2 may be arranged adjacent to each other as shown in FIG. 1.

The iron core 60 has a structure in which a central iron core 601 and an outer iron core 602 are combined. Each of the central iron core 601 and the outer iron core 602 of the iron core 60 is formed of a laminated steel sheet in which silicon steel sheets are sticked together, for example. The central iron core 601 extends along the center axis Bc of the bobbin 40. Further, the central iron core 601 is inserted through a space 410 on the diameter-direction inner side of the primary bobbin 41. The outer iron core 602 extends on the diameter-direction outer side with respect to the secondary bobbin 42 and the secondary conductor 82, and connects both axial ends of the central iron core 601. Thus, the iron core 60 forms a closed magnetic circuit structure that electromagnetically couples the primary coil L1 and the secondary coil L2. In other words, the ignition coil 103 is formed by electromagnetic coupling of the primary coil L1 and the secondary coil L2.

As shown in FIG. 1, the one end 811 of the primary coil L1 is connected to the power supply line 150 that is the above-described conductor extending from the power supply device 102. The other end 812 of the primary coil L1 is connected to the igniter 104 described later. Under control of the igniter 104, a low direct-current voltage supplied from the power supply device 102 is applied to the one end 811 of the primary coil L1, and then a primary current that gradually increases starts to flow through the primary coil L1.

The one end 822 of the secondary coil L2 is connected to the spark plug 113 via the first connecting wire 121. The secondary conductor 82 has a wire size smaller than a wire size of the primary conductor 81. Further, the number of turns (for example, 8000) of the secondary conductor 82 in the secondary coil L2 is approximately 80 times or more the number of turns (for example, 100) of the primary conductor 81 in the primary coil L1. Thus, the ignition coil 103 steps up power of a low direct-current voltage supplied from the power supply device 102 to several thousands of volts to several tens of thousands of volts during interruption of a primary current, details of which will be given later. That is, a high voltage is induced in the secondary coil L2. Then, the secondary coil L2 supplies power of the induced high voltage to the spark plug 113. Consequently, electric spark is generated in the spark plug 113, and a fuel is ignited.

Meanwhile, the first connecting wire 121 includes two conductors arranged in parallel with each other. Hereinafter, these two conductors will be referred to as a "first connecting wire 121*a*", and a "first connecting wire 121*b*". Specifically, the two first connecting wires 121*a* and 121*b* are laid in parallel with each other between the one end 822 of the secondary coil L2 and the spark plug 113.

Further, in the present embodiment, in the first connecting wire 121*a* that is one of the two first connecting wires 121*a* and 121*b*, the first limiting diode 131 is interposed. The first limiting diode 131 is connected in series to the secondary coil L2. For the first limiting diode 131 of the present embodiment, a Zener diode is used. Alternatively, for the first limiting diode 131, an avalanche diode may be used. Moreover, the first limiting diode 131 is forward-biased when it is oriented in a direction from the one end 822 to the other end 821 of the secondary coil L2.

Further, in the present invention, for the first limiting diode 131, a diode having a breakdown voltage that is equal to or higher than a maximum value of an "ON-state voltage" described later and is lower than a "discharge maintaining voltage" at the gap d in the spark plug 113, is used. Note that the terms, "discharge maintaining voltage", mean a voltage to be applied to the gap d between the center electrode 161 and the ground electrode 162 of the spark plug 113 in order to maintain discharge at the gap d. The first limiting diode 131 of the present embodiment has a breakdown voltage that is equal to or higher than 1 kV and is equal to or lower than 2 kV. An effect produced by setting the breakdown voltage of the first limiting diode 131 to the above-mentioned value will be later described in detail.

Further, in the present embodiment, in the first connecting wire 121*b* that is the other of the two first connecting wires 121*a* and 121*b*, the first resistor 132 is interposed. The first resistor 132 is connected in series to the secondary coil L2. Moreover, the first resistor 132 of the present embodiment has a resistance value that is equal to or higher than 10 MΩ and is equal to or lower than 50 MΩ. An effect produced by setting the resistance value of the first resistor 132 to the above-mentioned value will be later described in detail.

In addition, as shown in FIG. 1, in the secondary coil L2, the other end 821 opposite to the one end 822 connected to the spark plug 113 is electrically connected directly or indirectly to the power supply device 102 via a conductor. Hereinafter, this conductor will be referred to as a "second connecting wire 122". In the present embodiment, the other end 821 of the secondary coil L2 is electrically connected to the power supply line 150 via the second connecting wire 122.

When a switching element 70 of the igniter 104 is placed in a closed state and a primary current flows through the primary coil L1 to charge the primary coil L1, a potential difference is caused between the one end 822 and the other end 821 of the secondary coil L2, details of which will be given later. Hereinafter, this period in which a primary current flows through the primary coil L1 to charge the primary coil L1 will be referred to as an "ON state". It depends on the winding direction of the secondary coil L2 whether a voltage to be induced across the one end 822 and the other end 821 of the secondary coil L2 is positive or negative. In the present embodiment, in an ON state, the one end 822 of the secondary coil L2 is at a voltage level higher than the other end 821. Meanwhile, hereinafter, a potential difference between the one end 822 and the other end 821 of the secondary coil L2 will be referred to as an "ON-state voltage". A maximum value of the ON-state voltage is calculated by multiplication of a voltage value of a direct-current voltage applied to the one end 811 of the primary coil L1 by the power supply device 102 via the power supply line 150, by a ratio of the number of turns of the secondary coil L2 to the number of turns of the primary coil L1.

For example, suppose a case in which a voltage value of a direct-current voltage applied to the one end 811 of the primary coil L1 is 12 V, the number of turns of the primary coil L1 is 100, and the number of turns of the secondary coil L2 is 8000. Then, a ratio of the number of turns of the secondary coil L2 to the number of turns of the primary coil L1 is 80, and hence a maximum value of the ON-state voltage is calculated as 12×80=960 V. Thus, a maximum value of a voltage applied to the one end 822 of the secondary coil L2 is, for example, approximately plus 480 V, and a minimum value of a voltage applied to the other end 821 of the secondary coil L2 is, for example, approximately minus 480 V. Further, depending on the circumstances, it can be supposed that a maximum value of a voltage applied to the one end 822 of the secondary coil L2 is approximately 0 V, and a minimum value of a voltage applied to the other end 821 of the secondary coil L2 is approximately minus 960 V. Meanwhile, at that time, a voltage applied to the power supply line 150 is 12 V.

Thus, a current directed toward the secondary coil L2 flows from the side where the power supply device 102 is present, via the power supply line 150 and the second connecting wire 122. It should be noted here that the first limiting diode 131 is interposed in the first connecting wire 121*a* of the first connecting wire 121 connecting the one end 822 of the secondary coil L2 and the spark plug 113. As described above, the breakdown voltage of the first limiting diode 131 is equal to or higher than 1 kV. That is, in the present embodiment, the breakdown voltage of the first limiting diode 131 is set so as not to fall below a maximum value of a voltage (differential voltage) applied to the one end 822 of the secondary coil L2 with respect to the ground point (ground) 151 during flow of a primary current through the primary coil L1. In other words, the breakdown voltage of the first limiting diode 131 is set so as not to fall below a maximum value of a voltage (differential voltage) applied to a cathode side of the first limiting diode 131 with respect to a voltage applied to an anode side of the first limiting diode 131 in an ON state. Hence, no current flows through the first connecting wire 121 in which the first limiting diode 131 is interposed.

Figure 3:
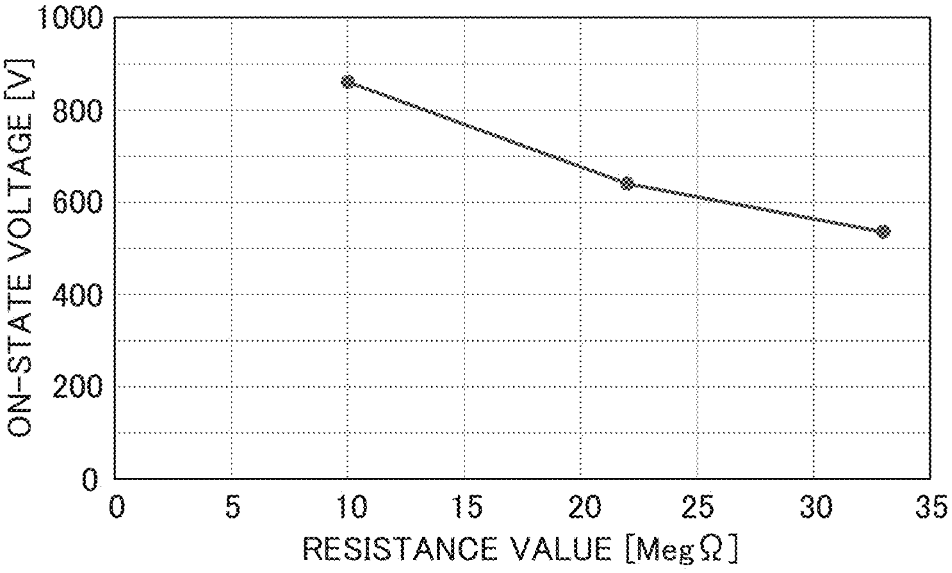
FIG. 3 shows a result of measuring a relationship between a resistance value of a first resistor and an ON-state voltage during flow of a primary current through a primary coil (in an ON state) according to the first preferred embodiment.

Further, in the first connecting wire 121*b* of the first connecting wire 121, the first resistor 132 is interposed. As described above, the resistance value of the first resistor 132 is equal to or higher than 10 MΩ. By setting the resistance value of the first resistor 132 to such a sufficiently high value as described above, it is possible to sufficiently reduce a current flowing via the first connecting wire 121*b* in an ON state. As a result of this, in an ON state, an ON-state voltage generated in the secondary coil L2 and a voltage (secondary voltage) generated at the one end 822 of the secondary coil L2 can be suppressed. This can suppress occurrence of discharge in the spark plug 113 in an ON state, that is, at an abnormal timing. Meanwhile, for reference, a result of measuring a relationship between the resistance value of the first resistor 132 and an ON-state voltage during flow of a primary current through the primary coil L1 (in an ON state) with the use of the ignition device 1 according to the present embodiment, is shown in FIG. 3. Note that FIG. 3 shows a result of measuring a relationship between the resistance value of the first resistor 132 and an ON-state voltage while changing the resistance value of the first resistor 132 to various values.

The igniter 104 is a semiconductor device that is connected to the primary coil L1 and controls a current flowing through the primary coil L1. Further, the igniter 104 is electrically connected to the ECU 105 and receives a signal from the ECU 105. Hereinafter, this signal will be referred to as an "EST signal". The igniter 104 includes the switching element 70 and a drive IC 71. The igniter 104 may be integral with an electronic circuit of the ECU 105.

For the switching element 70, an insulated-gate bipolar transistor (IGBT) is used, for example. The switching element 70 is interposed between the other end 812 of the primary coil L1 and a ground point (ground) 152. A collector (C) of the switching element 70 is connected to the other end 812 of the primary coil L1. An emitter (E) of the switching element 70 is connected to the ground point (ground) 152. A gate (G) of the switching element 70 is connected to the drive IC 71.

Thus, the switching element 70 can perform switching between passage and interruption of a primary current flowing through the primary coil L1 from the power supply device 102. When the switching element 70 is placed in a closed state, a primary current flows through the primary coil L1 from the power supply device 102. When the switching element 70 is placed in an open state, a primary current flowing through the primary coil L1 is interrupted. Meanwhile, other kinds of transistors may be used for the switching element 70.

The drive IC 71 is a control unit that controls switching of the switching element 70 in accordance with an EST signal received from the ECU 105. The drive IC 71 includes a logic device connected to the switching element 70. The logic device includes, for example, a logic circuit, a processor, a complex programmable logic device (CPLD), a field-programmable gate array (FPGA), an application-specific integrated circuit (ASIC), or the like. The logic device performs arithmetic processing for activating the ignition device 1, to achieve ignition in the spark plug 113.

1-2. Operations of Ignition Device

Figure 4:
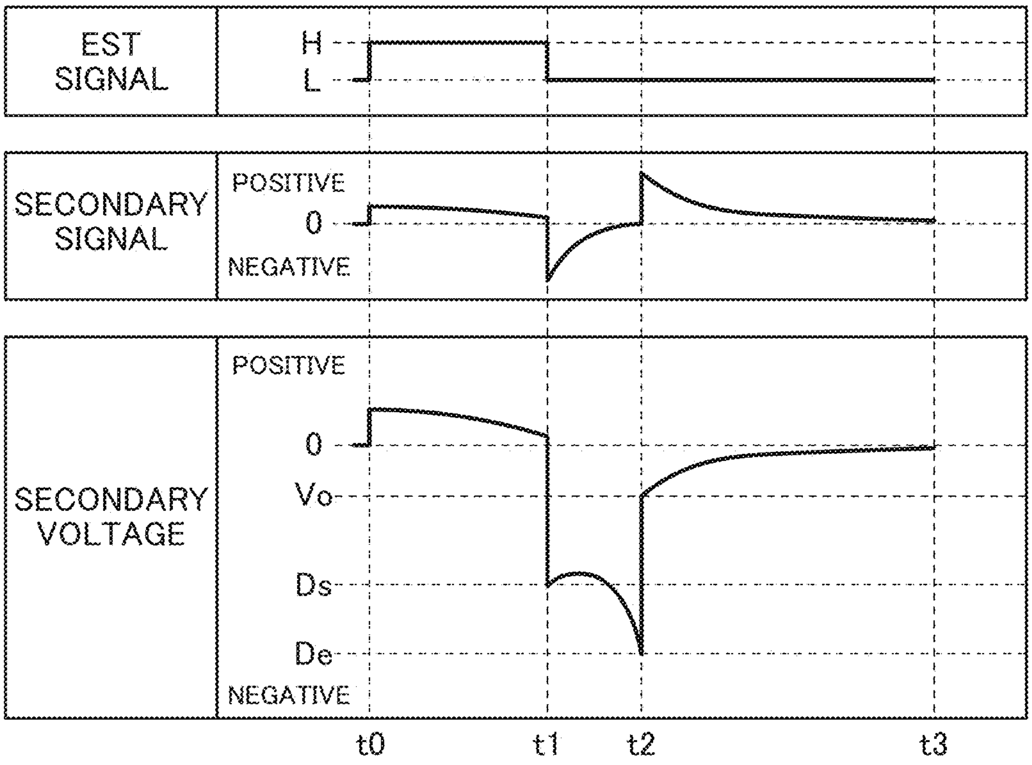
FIG. 4 is a graph showing in a time series, a waveform of an EST signal, a waveform of a current (secondary current) flowing through a secondary coil, and a waveform of a voltage (secondary voltage) applied to one end of the secondary coil at the time of activating the ignition device according to the first preferred embodiment.

Next, operations of the ignition device 1 will be described. FIG. 4 shows graphs respectively representing in a time series, a waveform of an EST signal, a waveform of a current (secondary current) flowing through the secondary coil L2, and a waveform of a voltage (secondary voltage) generated at the one end 822 of the secondary coil L2 at the time of activating the ignition device 1. Note that, regarding a secondary current in FIG. 4, "NEGATIVE" represents a direction from the one end 822 to the other end 821 of the secondary coil L2, and "POSITIVE" represents a direction from the other end 821 to the one end 822 of the secondary coil L2. Further, regarding a secondary voltage in FIG. 4, a value of a voltage applied to the one end 822 of the secondary coil L2 with respect to the ground point (ground) is shown.

As described above, a direct-current voltage is applied to the one end 811 of the primary coil L1 by the power supply device 102 via the power supply line 150. For example, a direct-current voltage of 12 V is applied to the one end 811 of the primary coil L1. Meanwhile, the other end 812 of the primary coil L1 is connected to the switching element 70. Further, the drive IC 71 controls switching of the switching element 70 in accordance with an EST signal received from the ECU 105. Note that, in the present embodiment, a fuel-gas mixture including a fuel is supplied to the combustion chamber of the single cylinder or each of the plurality of cylinders of the internal combustion engine so that the combustion chamber is filled with the fuel, and then, each ignition device 1 is activated immediately before a top dead center (TDC). As shown in FIG. 4, in activating the ignition device 1, first, the signal level of an EST signal transmitted from the ECU 105 to the drive IC 71 is changed from L to H at a time t0.

Then, the drive IC 71 changes the state of the switching element 70 from an open state to a closed state in accordance with the EST signal. This causes a primary current to flow through the primary conductor 81 forming the primary coil L1, so that the primary coil L1 is charged with electric charge. Hereinafter, such a process in which a primary current flows through the primary coil L1 to charge the primary coil L1 will be referred to as "charge control". Further, an energization magnetic flux is generated in the primary coil L1, and a magnetic field corresponding to the energization magnetic flux acts on the iron core 60.

Moreover, a potential difference, that is, an ON-state voltage, is generated across both ends 821 and 822 of the secondary coil L2 electromagnetically coupled to the primary coil L1 via the iron core 60 by an effect of mutual induction. For example, a potential difference of 960 V is generated across the one end 822 and the other end 821. As a result, a maximum value of a voltage applied to the one end 822 of the secondary coil L2 is positive, and a minimum value of a voltage applied to the other end 821 of the secondary coil L2 is negative. For example, a maximum value of a voltage applied to the one end 822 of the secondary coil L2 is approximately plus 480 V, and a minimum value of a voltage applied to the other end 821 of the secondary coil L2 is approximately minus 480 V. At that time, a voltage applied to the power supply line 150 is, for example, 12 V.

Thus, a current directed toward the secondary coil L2 flows from the side where the power supply device 102 is present, via the power supply line 150 and the second connecting wire 122. It should be noted here that the first limiting diode 131 is interposed in the first connecting wire 121*a* of the first connecting wire 121 connecting the one end 822 of the secondary coil L2 and the spark plug 113. As described above, the breakdown voltage of the first limiting diode 131 is equal to or higher than 1 kV. That is, in the present embodiment, the breakdown voltage of the first limiting diode 131 is set to a value that does not fall below a maximum value of a voltage (differential voltage) applied to the one end 822 of the secondary coil L2 with respect to the ground point (ground) 151 during flow of a primary current through the primary coil L1. In other words, the breakdown voltage of the first limiting diode 131 is set to a value that does not fall below a maximum value of a voltage (differential voltage) applied to the cathode side of the first limiting diode 131 with respect to a voltage applied to the anode side of the first limiting diode 131 in an ON state. For this reason, no current flows through the first connecting wire 121*a* in which the first limiting diode 131 is interposed.

Further, the first resistor 132 is interposed in the first connecting wire 121*b* of the first connecting wire 121. As described above, the resistance value of the first resistor 132 is equal to or higher than 10 MΩ. By setting the resistance value of the first resistor 132 to such a sufficiently high value as described, it is possible to sufficiently reduce a current flowing via the first connecting wire 121*b* in an ON state. As a result of this, in an ON state, an ON-state voltage generated in the secondary coil L2 or a voltage (secondary voltage) generated at the one end 822 of the secondary coil L2 can be suppressed. Consequently, occurrence of discharge in the spark plug 113 in an ON state, that is, at an abnormal timing, can be suppressed.

After the charge control, the signal level of the EST signal transmitted from the ECU 105 to the drive IC 71 is changed from H to L at a time t1. Then, the drive IC 71 changes the state of the switching element 70 from a closed state to an open state, to interrupt a primary current flowing from the power supply device 102 to the primary coil L1. As a result, induced electromotive force is generated in the secondary coil L2 electromagnetically coupled to the primary coil L1 via the iron core 60 by an effect of mutual induction. In the present embodiment, a high negative voltage is induced at the one end 822 of the secondary coil L2. At that time, a value of a voltage applied to the one end 822 of the secondary coil L2 (i.e., a value of a secondary voltage) ranges from minus several thousands of volts to minus several tens of thousands of volts with respect to the ground point (ground).

Further, an absolute value of the high negative voltage induced at the one end 822 of the secondary coil L2 exceeds the electrical breakdown voltage at the gap d in the spark plug 113. This causes electrical breakdown at the gap d in the spark plug 113. Then, there is generated a current that flows from the ground point (ground) 151 to the center electrode 161 of the spark plug 113 via the ground electrode 162 of the spark plug 113 (refer to FIG. 1). The thus generated current flows through the first limiting diode 131 in the forward direction, or flows through the first resistor 132, and further flows through the secondary coil L2. In the present embodiment, most of the current flows through the first limiting diode 131 in the forward direction while a part thereof flows through the first resistor 132, and the current further flows to a ground point (ground) 153 via the power supply device 102.

As a result, discharge occurs at the gap d in the spark plug 113, so that spark is generated and a fuel supplied to the combustion chamber of the internal combustion engine is ignited. When the fuel in the combustion chamber burns, the pressure in the combustion chamber increases, so that a piston moves from a top dead center (TDC) to a bottom dead center (BDC).

Note that, in the present invention, such a process in which the state of the switching element 70 is changed to an open state, a primary current flowing through the primary coil L1 is interrupted, and a high voltage is induced at the one end 822 of the secondary coil L2, to cause discharge at the gap d in the spark plug 113 will be referred to as "discharge control". In addition, when an absolute value of the high negative voltage induced at the one end 822 of the secondary coil L2 falls below the discharge maintaining voltage at the gap d in the spark plug 113 (at a time t2), the discharge at the gap d in the spark plug 113 ends once.

In this regard, the electrical breakdown voltage and the discharge maintaining voltage at the gap d in the spark plug 113 are significantly affected by the pressure in the combustion chamber. A voltage for causing electrical breakdown at the gap d in the spark plug 113 and a voltage for maintaining discharge at the gap d are substantially proportional to the pressure in the combustion chamber. Note that these voltages represent each an absolute value of the high voltage induced at the one end 822 of the secondary coil L2. Meanwhile, by the "discharge control", the fuel in the combustion chamber burns, so that the pressure increases, as described above. Thus, in a case in which the pressure in the combustion chamber becomes high, or the fuel burns and vigorously flows, the absolute value of the high voltage induced at the one end 822 of the secondary coil L2 becomes higher in some cases.

As shown in FIG. 4, also in the present embodiment, by the "discharge control", the absolute value of the high negative voltage induced at the one end 822 of the secondary coil L2 temporarily approaches zero from a value (Ds) at a starting point of the "discharge control", but increases again due to subsequent increase of the pressure in the combustion chamber or vigorous flow of the fuel. Then, a value (De) at an ending point of the "discharge control" has an absolute value larger than that of the value (Ds) at the starting point of the "discharge control". That is, in the present embodiment, the absolute value of the voltage induced at the one end 822 of the secondary coil L2 at the ending point of the discharge control is larger than the absolute value of the voltage induced at the one end 822 of the secondary coil L2 at the starting point of the discharge control.

Further, as described above, the floating capacitor Cs comprising an electrostatic capacitance component of approximately 15 to 20 pF is formed between the one end 822 of the secondary coil L2 and the spark plug 113. Because of this, in some cases, electric charge still remains in spots such as a spot near the one end 822 of the secondary coil L2, the first connecting wire 121, or a spot near the center electrode 161 of the spark plug 113 even at a time (the time t2) when the discharge at the gap d in the spark plug 113 ends once. In the present embodiment, negative electric charge remains in those spots. As a result, a residual voltage value at the one end 822 of the secondary coil L2 is negative with respect to the ground point (ground) at the time t2. Note that the residual voltage value represents the value (De) at the ending point of the "discharge control". At the time t2, the residual voltage value at the one end 822 of the secondary coil L2 is, for example, minus several tens of thousands of volts with respect to the ground point (ground).

Meanwhile, at the time t2, the pressure in the combustion chamber is high, and the absolute value of the above-described residual voltage value is lower than the discharge maintaining voltage at the gap d in the spark plug 113. However, to leave this condition unattended might possibly cause discharge to occur again at the gap d in the spark plug 113 at an unexpected timing such as a time when the pressure in the internal combustion engine is changed afterward. Note that, as an unexpected timing, a time when the pressure in the cylinder is reduced and a new fuel-gas mixture flows in during an intake process or the like in a next cycle, is cited, for example.

Then, according to the present invention, a diode having a breakdown voltage that is lower than the discharge maintaining voltage at the gap d in the spark plug 113 and the absolute value of the above-described residual voltage value (De) is used as the first limiting diode 131. The breakdown voltage of the first limiting diode 131 used in the present embodiment is equal to or lower than 2 kV. Meanwhile, in the above-described example, the residual voltage value (De) at the one end 822 of the secondary coil L2 is negative, and the absolute value of the corresponding numerical value exceeds the breakdown voltage of the first limiting diode 131. Note that the residual voltage value (De) at the one end 822 of the secondary coil L2 is the residual voltage value (De) on the cathode side of the first limiting diode 131 and is, for example, minus several tens of thousands of volts.

This allows a current to flow suddenly and abundantly through the first limiting diode 131 in the reverse direction from the side where the power supply device 102 is present, without occurrence of further discharge in the spark plug 113 after the end of discharge. Specifically, a current (secondary current) flows toward the secondary coil L2 from the side where the power supply device 102 is present, via the second connecting wire 122.

Consequently, electric charge remaining in spots such as a spot near the one end 822 of the secondary coil L2, the first connecting wire 121, or a spot near the center electrode 161 of the spark plug 113 is removed, and thus the absolute value of the voltage (secondary voltage) applied to the one end 822 of the secondary coil L2 is significantly reduced at once, so that residual energy remaining in those spots can be reduced. Thus, the absolute value of the voltage applied to the center electrode 161 of the spark plug 113 is significantly reduced to the breakdown voltage of the first limiting diode 131 at once. Hereinafter, the thus reduced absolute value of the voltage (secondary voltage) applied to the one end 822 of the secondary coil L2 will be referred to as an "initial residual voltage Vo". As shown in FIG. 4, at a time (time t2) when the discharge ends, the absolute value of the voltage (secondary voltage) applied to the one end 822 of the secondary coil L2 is significantly reduced at once, and the value after being reduced can be regarded as being the "initial residual voltage Vo".

Further, as described above, the first connecting wire 121*b* is laid in parallel with the first connecting wire 121*a* in which the first limiting diode 131 is interposed, and the first resistor 132 is interposed in the first connecting wire 121*b*. After the absolute value of the voltage applied to the center electrode 161 of the spark plug 113 is reduced to the breakdown voltage (initial residual voltage Vo) of the first limiting diode 131, a current flows mainly via the first connecting wire 121*b*. More specifically, a current (secondary current) flows through the first connecting wire 121*b* in which the first resistor 132 is interposed, from the side where the power supply device 102 is present, via the second connecting wire 122 and the secondary coil L2.

Further, in the present embodiment, the resistance value of the first resistor 132 is equal to or lower than 50 MΩ. By setting the resistance value of the first resistor 132 to such a low value as described, it is possible to keep a certain amount of current or more flowing from the side where the power supply device 102 is present, via the first connecting wire 121*b* after the end of discharge. This enables further reduction of residual energy remaining near the one end 822 of the secondary coil L2, in the first connecting wire 121, near the center electrode 161 of the spark plug 113, or the like, and allows the energy to converge toward zero earlier.

Meanwhile, in the ignition device 1 according to the present embodiment, an absolute value "Vt" of a voltage after elapse of a time period t from the time when the absolute value of the voltage (secondary voltage) applied to the one end 822 of the secondary coil L2 becomes equal to the breakdown voltage (initial residual voltage Vo) of the first limiting diode 131 can be calculated by an expression of "$Vt=Vo\times\exp(-t/(C\times R))$". Note that, in the expression, "C" represents a value of the above-described "floating capacitor Cs", and "R" represents the resistance value of the first resistor 132. Further, the "voltage after elapse of a time period t" represents the "voltage that has been reduced".

Figure 5:
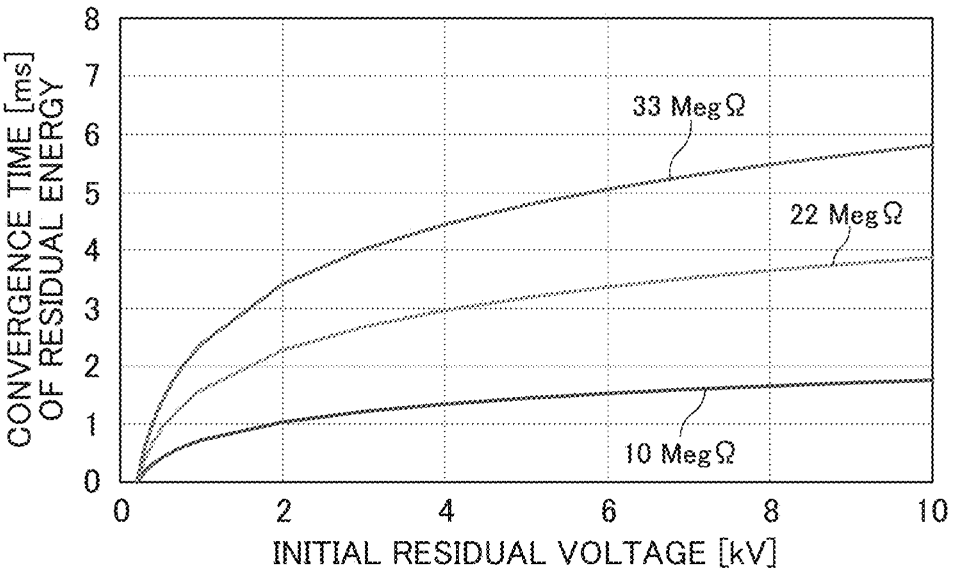
FIG. 5 shows a result of measuring, by simulation, a time taken for an absolute value of a voltage (secondary voltage) applied to one end of the secondary coil to converge to 200 V while changing an initial residual voltage, with the use of the ignition device according to the first preferred embodiment.

In addition, for reference, FIG. 5 shows a result of measuring, by simulation, a time period taken for the absolute value of the voltage (secondary voltage) applied to the one end 822 of the secondary coil L2 to converge to 200 V, with the use of the ignition device 1 according to the present embodiment in each of respective cases in which the resistance value of the first resistor 132 is "10 MΩ", "22 MΩ", and "33 MΩ". Note that FIG. 5 shows a result of measuring a time period taken for the absolute value of the voltage applied to the one end 822 of the secondary coil L2 to converge to 200 V while changing the initial residual voltage Vo [kV].

As described above, in the present embodiment, the "initial residual voltage Vo" is significantly reduced to the breakdown voltage of the first limiting diode 131 at once at the time (time t2) when the discharge ends. Specifically, the "initial residual voltage Vo" is significantly reduced to 2 kV or lower at once. Thus, as shown in FIG. 5, it has been confirmed that the absolute value of the voltage (secondary voltage) applied to the one end 822 of the secondary coil L2 converges to 200 V within approximately 3.5 milliseconds even in the cases in which the resistance value of the first resistor 132 is "10 MΩ", "22 MΩ", and "33 MΩ".

It should be noted here that the ignition device 1 of the present embodiment is used for a high-speed internal combustion engine as described above. For example, in a case in which discharge control is performed near a top dead center (TDC) in an internal combustion engine of which number of revolutions is 16,000 rpm, an intake process in a next cycle is started approximately 3.75 milliseconds later. As described above, in the present embodiment, even in the cases in which the resistance value of the first resistor 132 is "10 MΩ", "22 MΩ", and "33 MΩ", the absolute value of the voltage (secondary voltage) applied to the one end 822 of the secondary coil L2 converges to 200 V within approximately 3.5 milliseconds. Thus, it has been confirmed that a fuel is prevented from being ignited due to occurrence of discharge also in an intake process or the like in a next cycle.

As is made clear from the foregoing description, in the present embodiment, first, for charge control, when a primary current flows through the primary coil L1 (in an ON state), a current flowing through the secondary coil L2 can be suppressed by the first limiting diode 131 and the first resistor 132 connected in parallel. This enables reduction of an ON-state voltage generated in the secondary coil L2. Consequently, occurrence of discharge in the spark plug 113 in an ON state can be suppressed.

Further, after the end of discharge, a current (secondary current) flows suddenly and abundantly through the first limiting diode 131 in the reverse direction from the side where the power supply device 102 is present, via the second connecting wire 122 and the secondary coil L2. Thus, electric charge remaining in spots such as a spot near the one end 822 of the secondary coil L2, the first connecting wire 121, or a spot near the center electrode 161 of the spark plug 113 can be removed at once. As a result, the absolute value of the voltage value caused by residual energy remaining in those spots can be significantly reduced to the breakdown voltage of the first limiting diode 131 at once, first. Further, after that, a current flows via the first resistor 132, so that the absolute value of the voltage value caused by the residual energy remaining in those spots can be reduced toward zero earlier.

Consequently, even in a case in which there is a change in the pressure in the internal combustion engine afterward, occurrence of discharge at the gap d in the spark plug 113 at an abnormal timing can be suppressed. This prevents a fuel from being ignited at an abnormal timing also in an internal combustion engine that uses a fuel including hydrogen having properties of high combustibility at relatively low temperatures and of a high combustion rate, leading to suppression of breakage of the engine and the like.

2. Second Preferred Embodiment

Next, a second preferred embodiment of the present invention will be described. Note that, in the following description, differences from the first preferred embodiment will be mainly described, and duplicated description of parts similar to the first preferred embodiment will be omitted.

Figure 6:
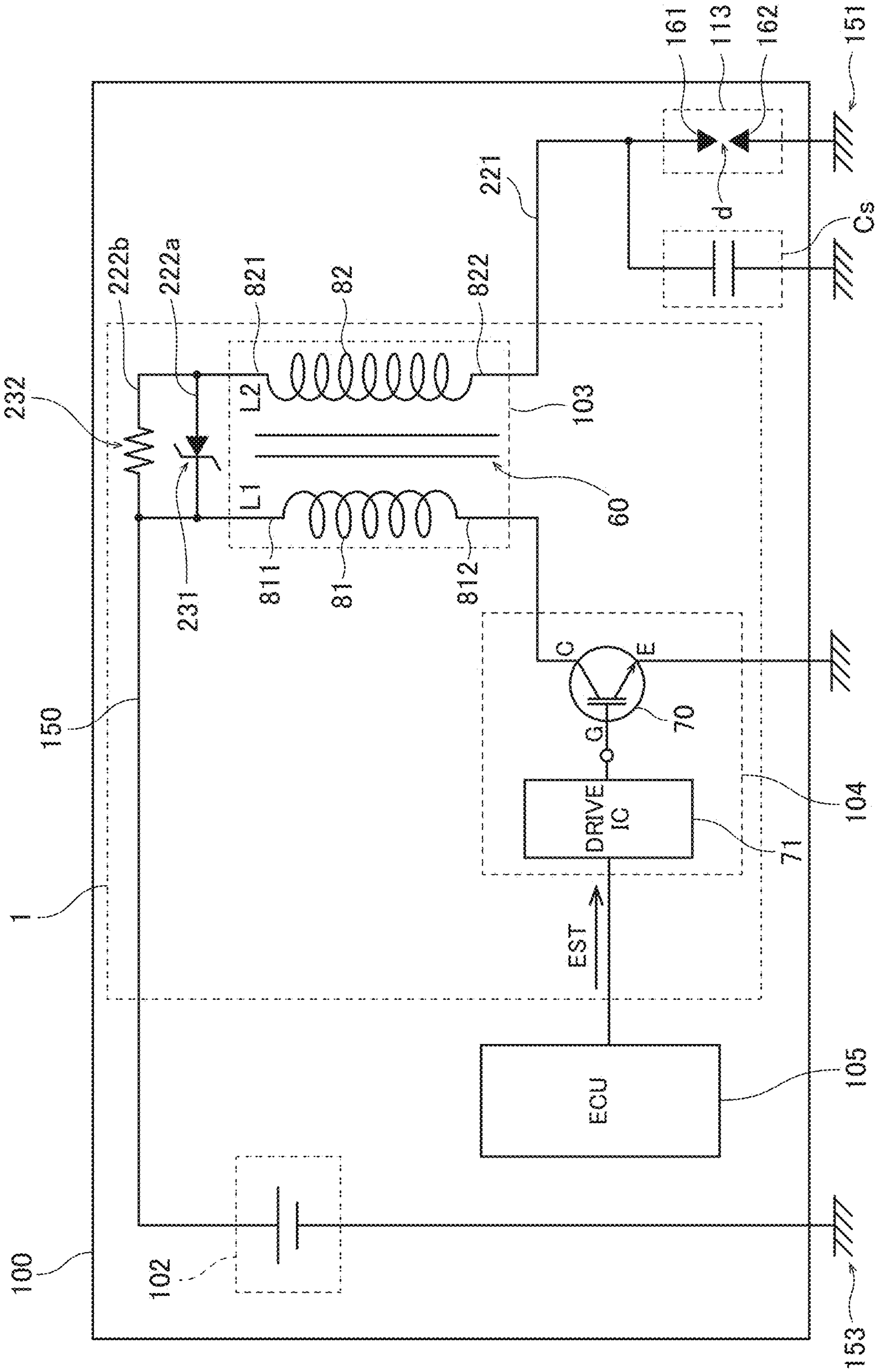
FIG. 6 is a block diagram schematically showing an operating environment of an ignition device for use in an internal combustion engine according to a second preferred embodiment.

FIG. 6 is a block diagram schematically showing an operating environment of the ignition device 1 according to the second preferred embodiment. As shown in FIG. 6, in the second preferred embodiment, the one end 822 of the secondary coil L2 is electrically connected directly or indirectly to the spark plug 113 via a conductor. Hereinafter, this conductor will be referred to as a "first connecting wire 221".

Further, in the secondary coil L2, the other end 821 opposite to the one end 822 connected to the spark plug 113 is electrically connected directly or indirectly to the power supply device 102 via two conductors. Hereinafter, these two conductors will be referred to as a "second connecting wire 222*a*" and a "second connecting wire 222*b*". The second connecting wires 222*a* and 222*b* are laid in parallel between the other end 821 of the secondary coil L2 and the power supply device 102. In the present embodiment, the other end 821 of the secondary coil L2 is electrically connected to the power supply line 150 via the second connecting wire 222*a* or the second connecting wire 222*b*.

Further, in the present embodiment, in the second connecting wire 222*a* that is one of the two second connecting wires 222*a* and 222*b*, a second limiting diode 231 is interposed. The second limiting diode 231 is connected in series to the secondary coil L2. For the second limiting diode 231 of the present embodiment, a Zener diode is used. Alternatively, an avalanche diode may be used for the second limiting diode 231. Moreover, the second limiting diode 231 is forward-biased when it is oriented in a direction from the one end 822 to the other end 821 of the secondary coil L2.

Further, in the present embodiment, for the second limiting diode 231, a diode having a breakdown voltage that is equal to or higher than a maximum value of an ON-state voltage and is lower than the discharge maintaining voltage at the gap d in the spark plug 113, is used. Specifically, the breakdown voltage of the second limiting diode 231 is equal to or higher than a value calculated by multiplication of a voltage value of a direct-current voltage applied to the one end 811 of the primary coil L1 by the power supply device 102 via the power supply line 150 by a ratio of the number of turns of the secondary coil L2 to the number of turns of the primary coil L1. More specifically, the breakdown voltage of the second limiting diode 231 of the present embodiment is equal to or higher than 1 kV and is equal to or lower than 2 kV.

Further, in the present embodiment, in the second connecting wire 222*b* that is the other of the two second connecting wires 222*a* and 222*b*, a second resistor 232 is interposed. The second resistor 232 is connected in series to the secondary coil L2. The second resistor 232 of the present embodiment has a resistance value that is equal to or higher than 10 MΩ and is equal to or lower than 50 MΩ. Moreover, the floating capacitor Cs comprising an electrostatic capacitance component of approximately 15 to 20 pF is formed between the one end 822 of the secondary coil L2 and the spark plug 113.

In the present embodiment, first, for charge control, when a primary current flows through the primary coil L1 (in an ON state), an ON-state voltage is generated across both ends 821 and 822 of the secondary coil L2. For example, a potential difference of 960 V is generated across the one end 822 and the other end 821 of the secondary coil L2. A maximum value of a voltage applied to the one end 822 of the secondary coil L2 is positive, and a minimum value of a voltage applied to the other end 821 of the secondary coil L2 is negative. For example, a maximum value of a voltage applied to the one end 822 of the secondary coil L2 is approximately plus 480 V, and a minimum value of a voltage applied to the other end 821 of the secondary coil L2 is approximately minus 480 V. Meanwhile, at that time, a voltage applied to the power supply line 150 is, for example, 12 V.

Thus, a current directed toward the secondary coil L2 flows from the side where the power supply device 102 is present, via the power supply line 150. It should be noted here that the second limiting diode 231 is interposed in the second connecting wire 222*a* connecting the other end 821 of the secondary coil L2 and the power supply line 150. As described above, the second limiting diode 231 is forward-biased when it is oriented in a direction from the one end 822 to the other end 821 of the secondary coil L2. Further, the breakdown voltage of the second limiting diode 231 is equal to or higher than 1 kV. That is, in the present embodiment, the breakdown voltage of the second limiting diode 231 is set so as not to fall below a differential voltage of a voltage value applied to the power supply line 150 with respect to a minimum value of a voltage applied to the other end 821 of the secondary coil L2 during flow of a primary current through the primary coil L1. In other words, the breakdown voltage of the second limiting diode 231 is set so as not to fall below a differential voltage of a voltage value applied to the cathode side of the second limiting diode 231 with respect to a minimum value of a voltage applied to the anode side of the second limiting diode 231 in an ON state. Note that the minimum value of the voltage applied to the other end 821 of the secondary coil L2 is, for example, minus 480 V. Meanwhile, the value of the voltage applied to the power supply line 150 is, for example, plus 12 V. Thus, no current flows through the second connecting wire 222*a* in which the second limiting diode 231 is interposed.

Further, the second resistor 232 is interposed in the second connecting wire 222*b*. As described above, the resistance value of the second resistor 232 is equal to or higher than 10 MΩ. By setting the resistance value of the second resistor 232 to such a sufficiently high value as described, it is possible to sufficiently reduce a current flowing via the second connecting wire 222*b* in an ON state. As a result of this, in an ON state, an ON-state voltage generated in the secondary coil L2 and a voltage (secondary voltage) generated at the one end 822 of the secondary coil L2 can be reduced. This can suppress occurrence of discharge in the spark plug 113 in an ON state, that is, at an abnormal timing.

Further, for discharge control, the state of the switching element 70 is changed from a closed state to an open state, and a primary current flowing from the power supply device 102 to the primary coil L1 is interrupted. As a result, a high negative voltage ranging from minus several thousands of volts to minus several tens of thousands of volts is induced at the one end 822 of the secondary coil L2. This causes electrical breakdown at the gap d in the spark plug 113. Then, there is generated a current directed toward the center electrode 161 of the spark plug 113 from the ground point (ground) 151 via the ground electrode 162 of the spark plug 113 (refer to FIG. 6). The thus generated current flows through the first connecting wire 221 and the secondary coil L2, and flows through the second limiting diode 231 in the forward direction or flows through the second resistor 232. In the present embodiment, most of the current flows through the second limiting diode 231 in the forward direction while a part thereof flows through the second resistor 232, and the current further flows to the ground point (ground) 153 via the power supply device 102.

Consequently, discharge occurs at the gap d in the spark plug 113, to generate spark, so that a fuel supplied to the combustion chamber of the internal combustion engine is ignited. In addition, when the absolute value of the high negative value induced at the one end 822 of the secondary coil L2 falls below the discharge maintaining voltage at the gap d in the spark plug 113, the discharge at the gap d in the spark plug 113 ends once.

Further, in the same manner as in the first preferred embodiment, a diode having a breakdown voltage that is lower than the electrical breakdown voltage at the gap d in the spark plug 113 and the absolute value of the residual voltage value (De) at the one end 822 of the secondary coil L2 at the end of discharge is used as the second limiting diode 231. The breakdown voltage of the second limiting diode 231 used in the present embodiment is equal to or lower than 2 kV. At that time, the residual voltage value (De) at the one end 822 of the secondary coil L2 is negative. Note that the residual voltage value (De) at the one end 822 of the secondary coil L2 is the residual voltage value (De) on the anode side of the second limiting diode 231, and is, for example, minus several tens of thousands of volts. Meanwhile, the voltage applied to the power supply line 150 is, for example, 12 V. In other words, the voltage applied to the cathode side of the second limiting diode 231 is, for example, 12 V.

This allows a current to flow suddenly and abundantly through the second limiting diode 231 in the reverse direction from the side where the power supply device 102 is present, without occurrence of further discharge in the spark plug 113 after the end of discharge. That is, a current (secondary current) flows toward the secondary coil L2 from the side where the power supply device 102 is present, via the second connecting wire 222*a*.

Consequently, electric charge remaining in spots such as a spot near the one end 822 of the secondary coil L2, the first connecting wire 221, or a spot near the center electrode 161 of the spark plug 113 is removed, and thus the absolute value of the voltage (secondary voltage) applied to the one end 822 of the secondary coil L2 is significantly reduced at once, so that residual energy remaining in those spots can be reduced. Thus, the absolute value of the voltage (secondary voltage) applied to the one end 822 of the secondary coil L2 is significantly reduced to the substantially same value as the breakdown voltage of the second limiting diode 231 at once.

Further, as described above, the second connecting wire 222*b* is laid in parallel with the second connecting wire 222*a* in which the second limiting diode 231 is interposed, and the second resistor 232 is interposed in the second connecting wire 222*b*. After the voltage value at the one end 822 of the secondary coil L2 is reduced to the substantially same value as the breakdown voltage of the second limiting diode 231, a current flows via the second connecting wire 222*b*. More specifically, a current (secondary current) flows toward the secondary coil L2 from the side where the power supply device 102 is present, via the second connecting wire 222*b* in which the second resistor 232 is interposed.

Moreover, in the present embodiment, the resistance value of the second resistor 232 is equal to or lower than 50 MΩ. By setting the resistance value of the second resistor 232 to such a low value as described, it is possible to keep a certain amount of current or more flowing from the side where the power supply device 102 is present, via the second connecting wire 222*b*, after the end of discharge. This enables further reduction of residual energy remaining near the one end 822 of the secondary coil L2, in the first connecting wire 221, near the center electrode 161 of the spark plug 113, or the like, and allows the energy to converge toward zero earlier.

As is made clear from the foregoing description, in the present embodiment, first, for charge control, when a primary current flows through the primary coil L1 (in an ON state), a current flowing through the secondary coil L2 can be suppressed by the second limiting diode 231 and the second resistor 232 connected in parallel. This enables reduction of an ON-state voltage generated in the secondary coil L2. Consequently, occurrence of discharge in the spark plug 113 in an ON state can be suppressed.

Further, after the end of discharge, a current (secondary current) flows suddenly and abundantly through the second limiting diode 231 in the reverse direction from the side where the power supply device 102 is present, via the second connecting wire 222*a*. Thus, electric charge remaining in spots such as a spot near the one end 822 of the secondary coil L2, the first connecting wire 221, or a spot near the center electrode 161 of the spark plug 113 can be removed at once. As a result, an absolute value of a voltage value caused by residual energy remaining in those spots can be significantly reduced to the substantially same value as the breakdown voltage of the second limiting diode 231 at once, first. Further, after that, a current flows via the second resistor 232, so that the absolute value of the voltage value caused by the residual energy remaining in those spots can be reduced toward zero earlier.

Consequently, even in a case in which there is a change in the pressure in the internal combustion engine afterward, occurrence of discharge at the gap d in the spark plug 113 at an abnormal timing can be suppressed. This prevents a fuel from being ignited at an abnormal timing also in an internal combustion engine that uses a fuel including hydrogen having properties of high combustibility at relatively low temperatures and of a high combustion rate, leading to suppression of breakage of the engine and the like.

Meanwhile, in the first preferred embodiment, the first limiting diode 131 and the first resistor 132 are provided on the side where the one end 822 of the secondary coil L2 is present, as described above. In contrast thereto, in the present embodiment, the second limiting diode 231 and the second resistor 232 are provided on the side where the other end 821 of the secondary coil L2 is present. In this regard, in many cases, a floating capacitor comprising a small amount of electrostatic capacitance component is present also in the secondary coil L2 itself. For this reason, in a case in which the second limiting diode 231 and the second resistor 232 are provided on the side where the other end 821 of the secondary coil L2 is present, an electrostatic capacitance component included in the secondary coil L2 itself is superimposed on the above-described electrostatic capacitance component of approximately 15 to 20 pF formed between the one end 822 of the secondary coil L2 and the spark plug 113.

Thus, the superimposed electrostatic capacitance components have greater influence, to cause a fear that the above-described ON-state voltage may be further increased and the residual energy remaining at the time when the above-described discharge ends once may be increased. In view of this, it is preferred that the limiting diode and the resistor be provided on the side where the one end 822 of the secondary coil L2 is present. However, in terms of ease of securing a mounting space for the second limiting diode 231 and the second resistor 232, it is preferred that the limiting diode and the resistor be provided on the side where the other end 821 of the secondary coil L2 is present, as in the second preferred embodiment, in some cases.

3. Modifications

The illustrative preferred embodiments of the present invention have been described above, but the present invention is not limited to the above-described preferred embodiments.

According to the above-described embodiments and modifications, in charge control, a voltage applied to the one end 822 of the secondary coil L2 is positive and a voltage applied to the other end 821 of the secondary coil L2 is negative. Further, in discharge control, a high negative voltage ranging from minus several thousands of volts to minus several tens of thousands of volts is induced at the one end 822 of the secondary coil L2. Alternatively, the positive and negative of the voltage values at both ends 821 and 822 of the secondary coil L2 may be reversed by a change in a direction of winding of the primary conductor 81 in the primary coil L1 or a change in a direction of winding of the secondary conductor 82 in the secondary coil L2. In this case, the forward direction and the reverse direction of the first limiting diode 131 interposed in the first connecting wire 121*a* in the first preferred embodiment and the second limiting diode 231 interposed in the second connecting wire 222*a* in the second preferred embodiment are reversed.

Figure 7:
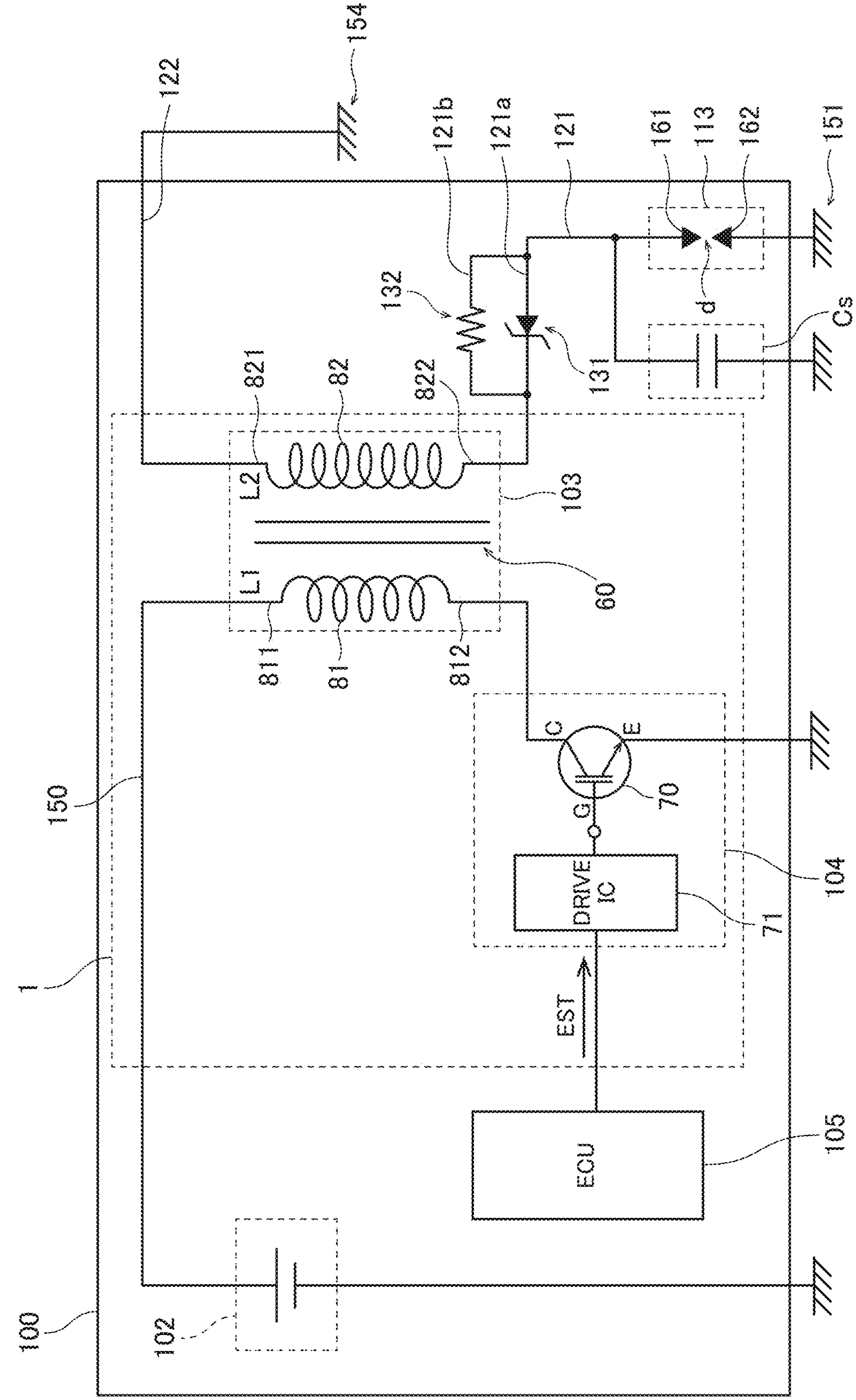
FIG. 7 is a block diagram schematically showing an operating environment of an ignition device for use in an internal combustion engine according to a first modification.
Figure 8:
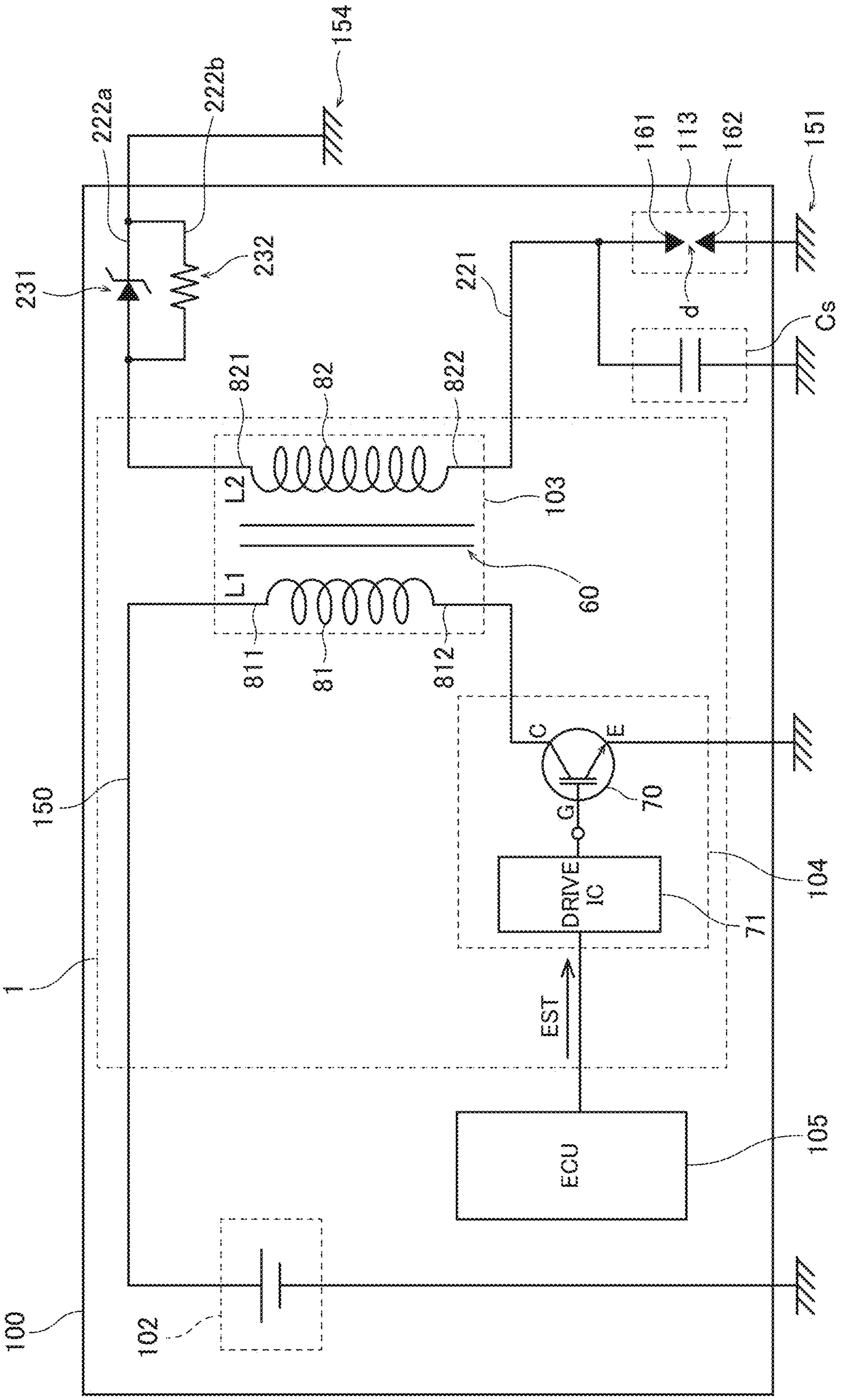
FIG. 8 is a block diagram schematically showing an operating environment of an ignition device for use in an internal combustion engine according to a second modification.

According to the above-described first preferred embodiment, the cathode side of the first limiting diode 131 and the other end 821 of the secondary coil L2 are connected to the positive side of the power supply device 102. Alternatively, as shown in FIG. 7 that shows a first modification, the cathode side of the first limiting diode 131 and the other end 821 of the secondary coil L2 may be connected to a ground point (ground) 154. Meanwhile, according to the second preferred embodiment, the cathode side of the second limiting diode 231 and the other end 821 of the secondary coil L2 are connected to the positive side of the power supply device 102. Alternatively, as shown in FIG. 8 that shows a second modification, the cathode side of the second limiting diode 231 and the other end 821 of the secondary coil L2 may be connected to the ground point (ground) 154.

Specifically, the second limiting diode 231 may be a Zener diode or an avalanche diode that is interposed in one of the two second connecting wires 222*a* and 222*b* laid in parallel between the other end 821 of the secondary coil L2 and the ground point (ground) 154 and is forward-biased when it is oriented in a direction from the one end 822 to the other end 821 of the secondary coil L2. Further, the second resistor 232 may be interposed in the other of the two second connecting wires 222*a* and 222*b*.

In the first modification and the second modification, first, for charge control, when a primary current flows through the primary coil L1 (in an ON state), an ON-state voltage is generated across both ends 821 and 822 of the secondary coil L2. For example, a potential difference of 960 V is generated across the one end 822 and the other end 821 of the secondary coil L2. A maximum value of a voltage applied to the one end 822 of the secondary coil L2 is positive, and a minimum value of a voltage applied to the other end 821 of the secondary coil L2 is negative. For example, a maximum value of a voltage applied to the one end 822 of the secondary coil L2 is approximately plus 480 V, and a minimum value of a voltage applied to the other end 821 of the secondary coil L2 is approximately minus 480 V.

It should be noted here that, in the first modification, the first limiting diode 131 and the first resistor 132 are interposed in the first connecting wires 121*a* and 121*b*. Meanwhile, in the second modification, the second limiting diode 231 and the second resistor 232 are interposed in the second connecting wires 222*a* and 222*b*. Each of the first limiting diode 131 and the second limiting diode 231 is forward-biased when it is oriented in a direction from the one end 822 to the other end 821 of the secondary coil L2. Thus, by flow of a current from the one end 822 to the other end 821 of the secondary coil L2, and further to the ground point (ground) 154, an ON-state voltage or a secondary voltage generated in the secondary coil L2 can be reduced. This can suppress occurrence of discharge in the spark plug 113 in an ON state, that is, at an abnormal timing.

Further, for discharge control, the state of the switching element 70 is changed from a closed state to an open state, and a primary current flowing from the power supply device 102 to the primary coil L1 is interrupted. As a result, a high negative voltage ranging from minus several thousands of volts to minus several tens of thousands of volts is induced at the one end 822 of the secondary coil L2. This causes electrical breakdown at the gap d in the spark plug 113. Then, in the first modification, there is generated a current (secondary current) directed toward the center electrode 161 of the spark plug 113 from the ground point (ground) 151 via the ground electrode 162 of the spark plug 113 (refer to FIG. 7). The thus generated current flows through the first connecting wire 121*a* in which the first limiting diode 131 is interposed, in the forward direction, or flows through the first connecting wire 121*b* in which the first resistor 132 is interposed, flows from the one end 822 to the other end 821 of the secondary coil L2, and further flows toward the ground point (ground) 154.

Meanwhile, in the second modification, there is generated a current (secondary current) that flows from the ground point (ground) 151 toward the center electrode 161 of the spark plug 113 via the ground electrode 162 of the spark plug 113 (refer to FIG. 8). The thus generated current further flows from the one end 822 to the other end 821 of the secondary coil L2, and flows through the second connecting wire 222*a* in which the second limiting diode 231 is interposed, in the forward direction, or flows through the second connecting wire 222*b* in which the second resistor 232 is interposed. Further, the current flows toward the ground point (ground) 154. Consequently, discharge occurs at the gap d in the spark plug 113, to generate spark, so that a fuel supplied to the internal combustion chamber is ignited.

Moreover, in the first modification, after the end of discharge, a current (secondary current) suddenly and abundantly flows through the first limiting diode 131 in the reverse direction from the ground point (ground) 154 via the secondary coil L2. As a result, electric charge remaining in spots such as a spot near the one end 822 of the secondary coil L2, the first connecting wire 121, or a spot near the center electrode 161 of the spark plug 113 can be removed at once. Consequently, an absolute value of a voltage value caused by residual energy remaining in those spots can be significantly reduced to the breakdown voltage of the first limiting diode 131 at once, first. Further, after that, a current flows from the ground point (ground) 154 via the first resistor 132, so that the absolute value of the voltage value caused by the residual energy remaining in those spots can be reduced toward zero earlier.

Meanwhile, in the second modification, after the end of discharge, a current (secondary current) suddenly and abundantly flows through the second limiting diode 231 in the reverse direction from the ground point (ground) 154 toward the secondary coil L2. As a result, electric charge remaining in spots such as a spot near the one end 822 of the secondary coil L2, the first connecting wire 221, or a spot near the center electrode 161 of the spark plug 113 can be removed at once. Consequently, an absolute value of a voltage value caused by residual energy remaining in those spots can be significantly reduced to the breakdown voltage of the second limiting diode 231 at once, first. Further, after that, a current flows from the ground point (ground) 154 via the second resistor 232, so that the absolute value of the voltage value caused by the residual energy remaining in those spots can be reduced toward zero earlier.

The ignition device of the present invention may be any device that is installed in various devices and industrial machines such as a power generator, in addition to a vehicle such as an automobile, and is used to generate electric spark in a spark plug of an internal combustion engine and ignite a fuel.

The details of the shapes and configurations of the above-described ignition device may be appropriately changed within a range not departing from the gist of the present invention. Further, the respective elements described in the above-described preferred embodiments and modifications may be appropriately combined unless contradiction arises.

What is claimed is:

1. An ignition device for use in an internal combustion engine that uses a fuel including at least hydrogen, comprising:

an ignition coil formed by electromagnetic coupling of a primary coil and a secondary coil;

a power supply device configured to apply a direct-current voltage to one end of the primary coil via a power supply line;

a switching element interposed between the other end of the primary coil and a ground point, the switching element being capable of performing switching between passage and interruption of a primary current flowing through the primary coil from the power supply device;

a spark plug configured to ignite the fuel by occurrence of discharge at a gap, in accordance with a high voltage induced at one end of the secondary coil;

a first limiting diode comprising a Zener diode or an avalanche diode that is interposed in one of two first connecting wires laid in parallel between the one end of the secondary coil and the spark plug, and is forward-biased when the diode is oriented in a direction from the one end to the other end of the secondary coil; and a first resistor interposed in the other of the two first connecting wires, wherein the first limiting diode has a breakdown voltage that is equal to or higher than a value calculated by multiplication of a voltage value of the direct-current voltage applied to the one end of the primary coil by the power supply device by a ratio of the number of turns of the secondary coil to the number of turns of the primary coil, and is lower than a discharge maintaining voltage at the gap in the spark plug, and the first resistor has a resistance value that is equal to or higher than 10 MΩ and is equal to or lower than 50 MΩ.

2. The ignition device according to claim 1, wherein the breakdown voltage is equal to or higher than 1 kV.

3. The ignition device according to claim 1, wherein the breakdown voltage is equal to or lower than 2 kV.

4. The ignition device according to claim 1, further comprising a control unit configured to control the switching of the switching element, wherein the control unit performs charge control in which the switching element is placed in a closed state, so that a primary current flows through the primary coil, to charge the primary coil, and performs discharge control in which, after the charge control, a state of the switching element is changed to an open state and a high voltage is induced at the one end of the secondary coil, so that discharge occurs at the gap in the spark plug, and an absolute value of the voltage induced at the one end of the secondary coil at an ending point of the discharge control is higher than an absolute value of the voltage induced at the one end of the secondary coil at a starting point of the discharge control.

5. The ignition device according to claim 1, further comprising a floating capacitor formed between the one end of the secondary coil and the spark plug.

6. An ignition device for use in an internal combustion engine that uses a fuel including at least hydrogen, comprising:

an ignition coil formed by electromagnetic coupling of a primary coil and a secondary coil;

a power supply device configured to apply a direct-current voltage to one end of the primary coil via a power supply line;

a switching element interposed between the other end of the primary coil and a ground point, the switching element being capable of performing switching between passage and interruption of a primary current flowing through the primary coil from the power supply device;

a spark plug configured to ignite the fuel by occurrence of discharge at a gap, in accordance with a high voltage induced at one end of the secondary coil;

a second limiting diode comprising a Zener diode or an avalanche diode that is interposed in one of two second connecting wires laid in parallel between the other end of the secondary coil and the power supply device or the ground point, and is forward-biased when the diode is oriented in a direction from the one end to the other end of the secondary coil; and a second resistor interposed in the other of the two second connecting wires, wherein the second limiting diode has a breakdown voltage that is equal to or higher than a value calculated by multiplication of a voltage value of the direct-current voltage applied to the one end of the primary coil by the power supply device by a ratio of the number of turns of the secondary coil to the number of turns of the primary coil, and is lower than a discharge maintaining voltage at the gap in the spark plug, and the second resistor has a resistance value that is equal to or higher than 10 MΩ and is equal to or lower than 50 MΩ.

7. The ignition device according to claim 6, wherein the breakdown voltage is equal to or higher than 1 kV.

8. The ignition device according to claim 6, wherein the breakdown voltage is equal to or lower than 2 kV.

* * * * *